US011113828B2

(12) United States Patent
Herman et al.

(10) Patent No.: US 11,113,828 B2
(45) Date of Patent: Sep. 7, 2021

(54) DETERMINING SENSOR INSTALLATION CHARACTERISTICS FROM CAMERA IMAGE

(71) Applicant: Google Inc., Mountain View, CA (US)

(72) Inventors: Kenneth Louis Herman, San Jose, CA (US); Aveek Ravishekhar Purohit, Mountain View, CA (US); Bryan James, Menlo Park, CA (US); Mark Rajan Malhotra, San Mateo, CA (US); Yash Modi, San Mateo, CA (US)

(73) Assignee: Google LLC, Mountain View, CA (US)

(*) Notice: Subject to any disclaimer, the term of this patent is extended or adjusted under 35 U.S.C. 154(b) by 1007 days.

(21) Appl. No.: 15/216,964

(22) Filed: Jul. 22, 2016

(65) Prior Publication Data

US 2018/0025599 A1    Jan. 25, 2018

(51) Int. Cl.
*G06T 7/50* (2017.01)
*G08B 29/22* (2006.01)
*G08B 13/196* (2006.01)

(52) U.S. Cl.
CPC .......... *G06T 7/50* (2017.01); *G08B 13/19602* (2013.01); *G08B 13/19636* (2013.01); *G06T 2207/10048* (2013.01); *G06T 2207/30232* (2013.01); *G08B 29/22* (2013.01)

(58) Field of Classification Search
CPC .................... G08B 13/19602; G08B 13/19636

USPC ......................................................... 348/155
See application file for complete search history.

(56) References Cited

U.S. PATENT DOCUMENTS

| 7,495,553 | B2 | 2/2009 | Schwarz et al. |
| 7,636,039 | B2 | 12/2009 | Babich et al. |
| 7,796,033 | B2 | 9/2010 | Green et al. |
| 8,731,864 | B2 | 5/2014 | Smith |
| 9,019,111 | B1* | 4/2015 | Sloo .................. F24F 11/30 340/628 |
| 2007/0255522 | A1* | 11/2007 | Gordon ............... G01N 29/07 702/150 |
| 2014/0085093 | A1* | 3/2014 | Mittleman ........... H04L 12/282 340/628 |
| 2014/0309782 | A1* | 10/2014 | Sharpe ................ G05D 21/02 700/266 |

* cited by examiner

*Primary Examiner* — Christopher S Kelley
*Assistant Examiner* — Asmamaw G Tarko
(74) *Attorney, Agent, or Firm* — Butzel Long (57) ABSTRACT

An image of at least a portion of a room may be received, the image of the room comprising an image of a sensor mounted in the room. At least one optical parameter related to the image of the room may also be received. A distance may be determined between the sensor and a camera that captured the image of the room, wherein the determination of the distance is based at least in part on the optical parameters and on known physical dimensions of the sensor. A sensitivity requirement of the sensor may be determined, based on the distance. The determined sensitivity may be sent to control logic of the sensor.

20 Claims, 8 Drawing Sheets

DETERMINING SENSOR INSTALLATION CHARACTERISTICS FROM CAMERA IMAGE

BACKGROUND

Sensors such as motion detectors may be used in homes or businesses for management of resources such as energy, or for security reasons. Moreover, such devices may be configurable. Their sensitivity to stimuli may be adjusted, for example, at installation or afterwards.

While the processes of installation and configuration may be performed by a professional installer, some sensors may be marketed as "do-it-yourself" (DIY) devices and systems. In such a situation, a homeowner buys a sensor and may perform the installation himself. Depending on the underlying technology of the sensor and the degree to which the device may be configured, installing and configuring a sensor may be difficult for an average homeowner. In some situations, the installation and configuration can be performed by the homeowner; but in order to achieve a workable level of performance from the device, some precision in the installation and/or configuration may be necessary. This level of precision may be beyond the skills of a typical homeowner.

BRIEF SUMMARY

According to an embodiment of the disclosed subject matter, an image of at least a portion of a room may be received, the image of the room comprising an image of a sensor mounted in the room. At least one optical parameter related to the image of the room may also be received. A distance may be determined between the sensor and a camera that captured the image of the room, wherein the determination of the distance is based at least in part on the optical parameters and on known physical dimensions of the sensor. A sensitivity requirement of the sensor may be determined, based on the distance. The determined sensitivity requirement may be sent to control logic of the sensor. The sensor may be configured to operate at the determined sensitivity. The sensor may comprise a motion detector. In an embodiment, this may be implemented by a system comprising a processor and a memory in communication with the processor, wherein the memory stores instructions that, when executed by the processor, cause the processor to perform the methods described herein.

In an embodiment, using the image, the height of the sensor above a floor of the room may be determined, wherein the determination of the height is based at least in part on the optical parameters and on the known physical dimensions of the sensor. A determination may be made as to whether the height of the sensor is within an appropriate range of heights; if not, an alert signal may be output. The alert signal may result in communication through a user interface, the communication suggesting relocation of the sensor.

In an embodiment, using the image, a separation between the sensor and a source of infrared radiation (IR) in the room may be determined, wherein the determination of the separation is based at least in part on the optical parameters and on the known physical dimensions of the sensor. A determination may be made as to whether the separation is within an appropriate range of separation; if not, an alert signal may be output. The alert signal may result in communication through a user interface, the communication suggesting relocation of the sensor. Sources of IR may comprise one of a window; a door; a heating, ventilation, or air conditioning (HVAC) vent; or an appliance.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

According to an embodiment of the disclosed subject matter, an image of at least a portion of a room may be received, the image of the room comprising an image of a sensor mounted in the room. At least one optical parameter related to the image of the room may also be received. A distance may be determined between the sensor and a camera that captured the image of the room, wherein the determination of the distance is based at least in part on the optical parameters and on known physical dimensions of the sensor. A sensitivity requirement of the sensor may be determined, based on the distance. The determined sensitivity may be sent to control logic of the sensor.

Figure 1:
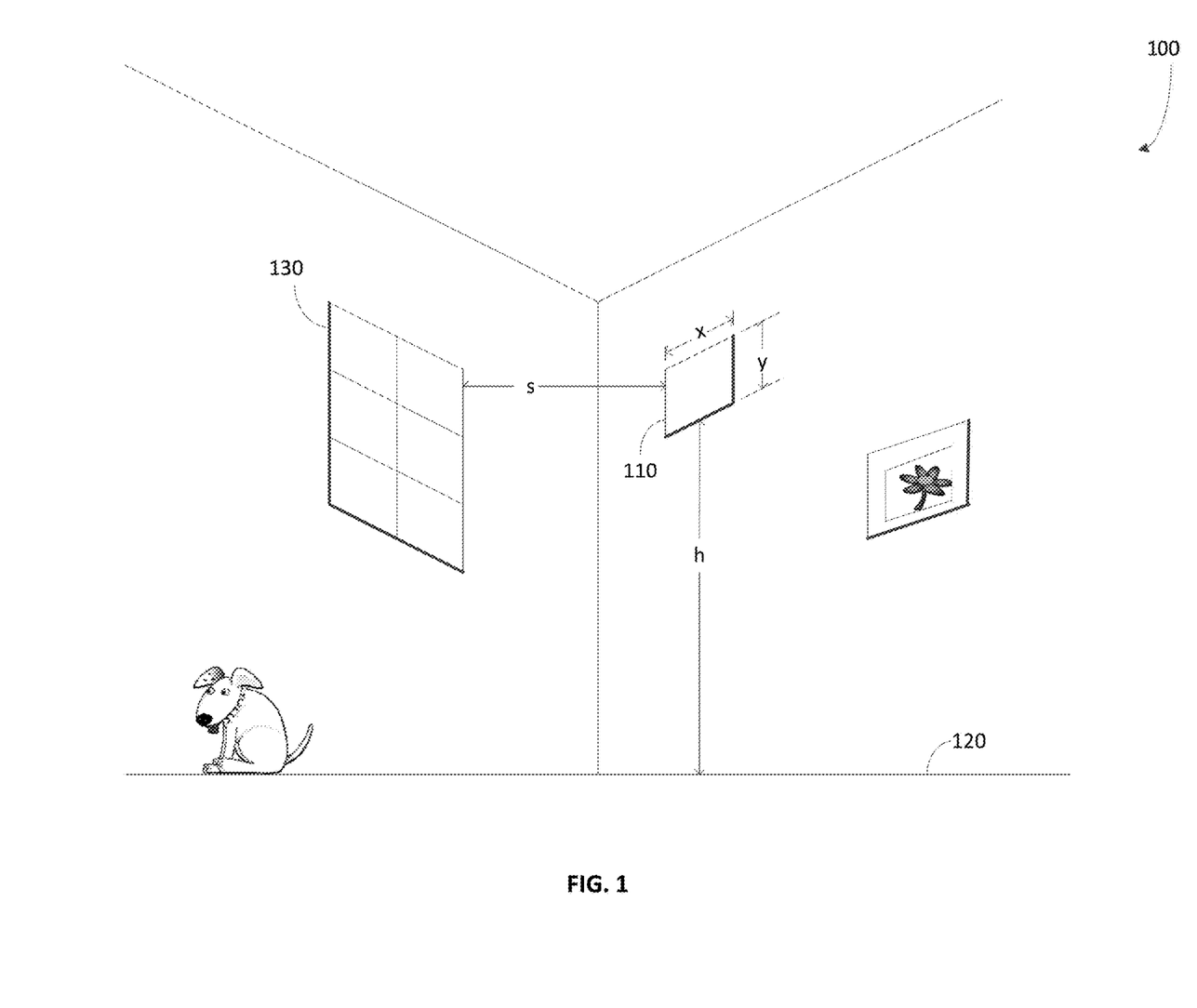
FIG. 1 shows a room in which an embodiment of the disclosed subject matter may operate.

An example context for an embodiment of the disclosed subject matter is illustrated in FIG. 1. A room 100 is shown; this may be a room in a home, office, or other setting. A sensor 110 is mounted on a wall. The sensor may be, for example, a motion detector. The motion detector may operate by detection of infrared radiation (IR), for example. To perform its function(s) in an optimal manner, the sensor 110 needs to be configured properly. In the case of an IR motion detector, the sensitivity of the sensor 110 may be configured so that it detects motion at the furthest possible distance at which detection is desired. As will be described in greater detail below, this may be achieved by capturing an image of the room where the image includes the sensor 110. The image of the room may be captured using a camera (not shown). In an embodiment, the camera may be a camera in a portable computing device, e.g., a smartphone, tablet, laptop, or a wearable computing device. In such an embodiment, the photographic process may be part of an application (an "app") that is used to assist a homeowner in installation and configuration of sensor 110. The image may be processed so that the distance between the camera and the sensor 110 is determined. If this image is taken from a vantage point corresponding to the furthest distance at which motion detection is desired, the determined distance can be used to configure the sensitivity of the sensor 110. The sensitivity of sensor 110 may be configured in a manner that allows detection at this distance.

In the absence of the system and method described herein, a user or installer would have to measure this distance manually, then configure the sensor accordingly. Proper configuration would therefore rely on the skill of the installer, possibly a DIY homeowner, in making this measurement. While some persons could do this, others may not be willing or able to do this. In this case, the subject matter described herein provides an automated way of making this measurement and appropriately configuring the sensor.

In addition, performance of the sensor 110 may be enhanced by installation of the device at an appropriate height above the floor 120. In an embodiment, by processing the captured image of the room, the height h from the floor 120 to the sensor 110 can be determined, assuming that the floor 120 is also captured in the image. This allows verification that the sensor 110 has been mounted at an acceptable height above the floor 120. In an embodiment, there may be a range of possible heights that allows acceptable performance of the sensor 110. The determined height h can then be compared to this range. If the height h is not in this range, an alert may be issued through the app, for example. The user or installer can then relocate sensor 110 as necessary.

Further, performance of the sensor 110 may be enhanced by installation of the device at an appropriate separation from stationary IR sources, such as a window 130 (i.e., sources other than the IR sources that the sensor may be intended to detect). If the sensor 110 is too close to such an IR source, the performance of the sensor 110 may be impaired. It is therefore helpful to ensure that there is sufficient separation between the sensor 110 and stationary IR sources. By processing the captured image of the room in an embodiment, the separation s between the window 130 and the sensor 110 can be determined, assuming that the window 130 (or other stationary IR source) is also captured in the image. This allows verification that the sensor 110 has been mounted at an acceptable distance from the window 130. In an embodiment, there may be a minimal threshold amount of separation that allows adequate performance of the sensor 110. The determined separation s can then be compared to this threshold. If separation s does not exceed this range, an alert may be issued through the app, for example. The user or installer can then relocate sensor 110 as necessary.

Figure 2:
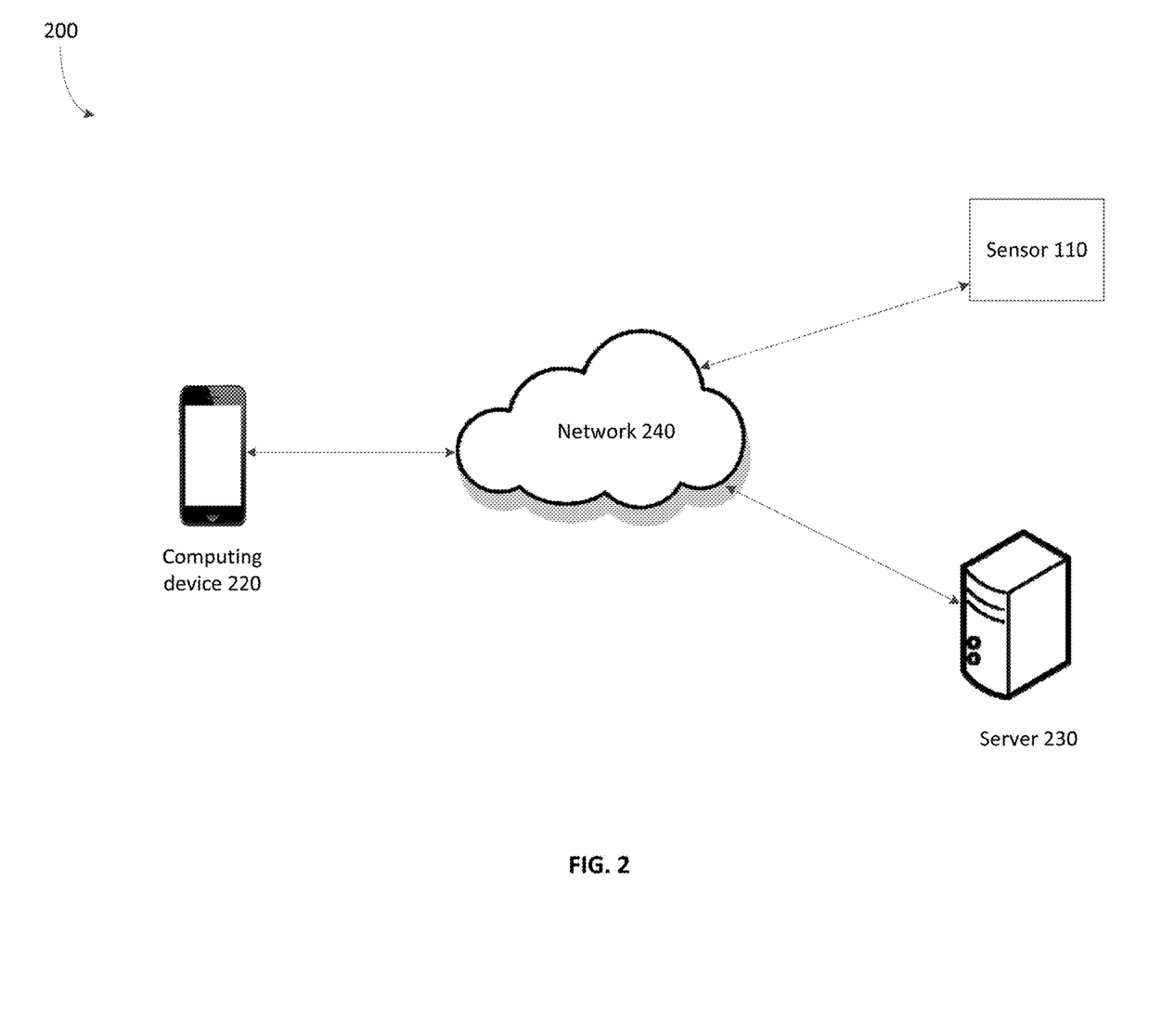
FIG. 2 shows communication between a computing device, a sensor, and a server, according to an embodiment of the disclosed subject matter.

Communications connectivity between the sensor 110 and a portable computing device 220 is illustrated in FIG. 2 according to an embodiment. Once an image of the room and the sensor has been captured by computing device 220, the image may be processed to determine values such as the distance to the sensor 110, the resulting sensitivity requirement of the sensor 110, the height h of the sensor 110 above the floor, and/or the separation of the sensor 110 from an IR source.

In an embodiment, some or all of this processing (discussed below with respect to FIGS. 3-5) may be performed by computing device 220. If the separation s and/or the height h are found not to be in acceptable respective ranges, then an alert may be communicated through a user interface of the computing device 220.

If the distance to the sensor 110 is determined at the computing device 220, a corresponding sensor sensitivity requirement may also be determined at the computing device 220 and communicated to sensor 110. There, control logic (not shown) may receive this indication of sensitivity and configure the sensor 110 accordingly. Alternatively, the computing device 220 may compute the distance to the sensor 110, then send this value to the sensor 110. There, the sensor 110 may determine the corresponding required sensitivity requirement and configure itself accordingly.

Alternatively, any or all of the computation described above may be performed by a computing device, such as a controller or server 230, external to computing device 220 and sensor 110. In such an embodiment, the captured image may be sent by computing device 220 to server 230. Here, the distance from the computing device 220 to the sensor 110, the corresponding sensitivity requirement, the separation s between the sensor 110 and another IR source, and/or the height h of the sensor 110 may be calculated. If the server 230 calculates a sensor sensitivity requirement, this sensitivity requirement may be communicated to control logic in sensor 110, which can then configure sensor 110 appropriately. If the server 230 calculates a height h of the sensor 110 and/or a separation s between sensor 110 and an IR source, and either value is determined not to be within an acceptable range, an alert signal may be generated by server 230 and provided to computing device 220 for output through a user interface in the latter device.

In the implementation of FIG. 2, communications between computing device 220, sensor 110, and server 230 are shown taking place via a network 240. This network may be a local area network, a wide area network, or an internet, or any combination thereof, and may use any communications protocol(s) known to persons of ordinary skill in the art. Moreover the server 230 may be collocated in the same building as sensor 110 (as a home network controller, for example), or may be external to the building. In an embodiment, the processing may take place "in the cloud", for example.

Figure 3:
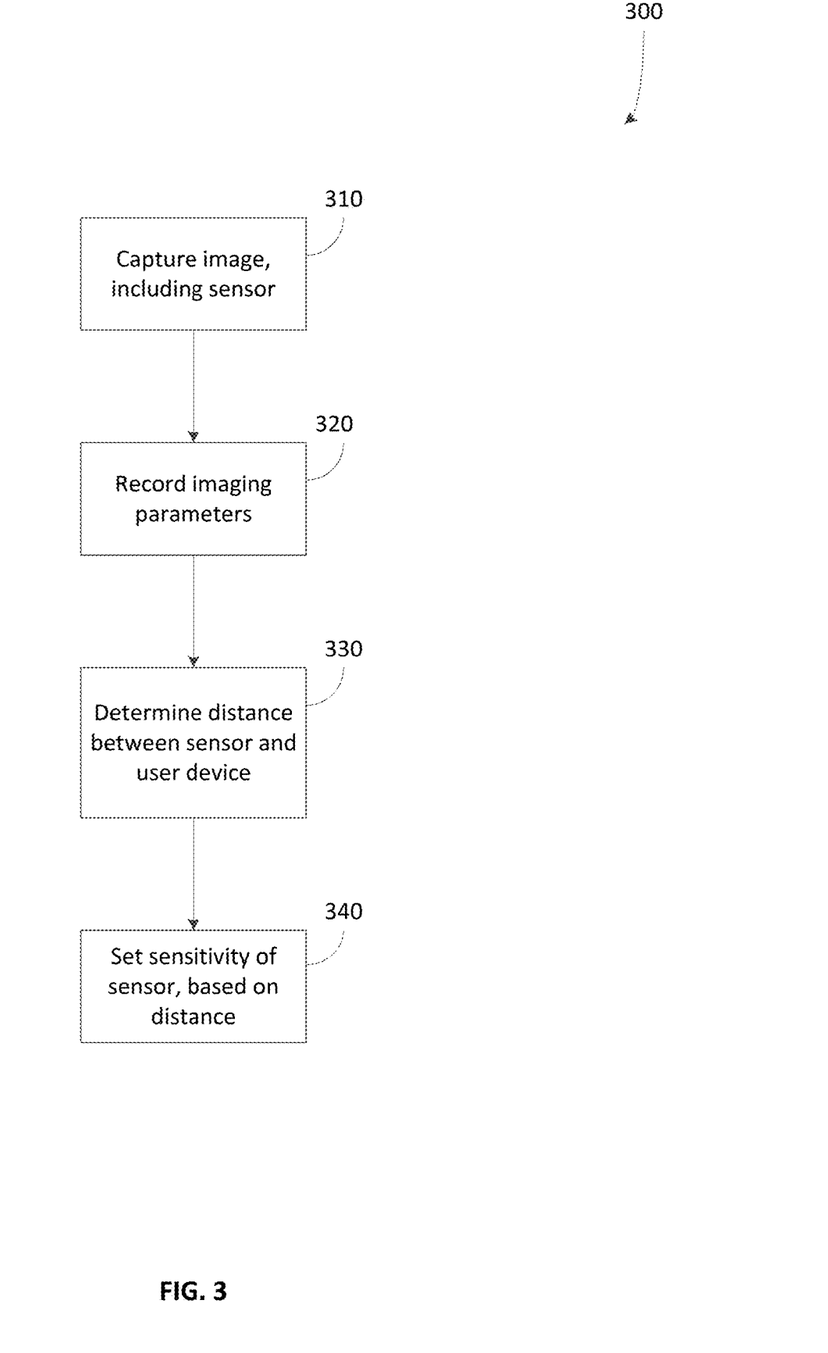
FIG. 3 shows a process that implements an embodiment of the disclosed subject matter.

FIG. 3 illustrates the processing that may take place when configuring the sensitivity of a sensor such as a motion detector, according to an embodiment. At 310, an image of a room may be captured, including a mounted sensor such as a motion detector. As discussed above, the image may be captured by a camera incorporated in a portable computing device such as a smartphone or tablet. In an embodiment, the camera may be activated and used as part of an app that supports the installation and/or operation of the sensor. The app may instruct an installer to go to a location in the room that corresponds to the furthest distance from the sensor at which stimuli is to be sensed. For example, if the sensor is a motion detector, the app may instruct the installer to go to a location at the furthest distance, from the motion detector, at which motion is to be detected. From this location, the app may instruct the installer to take a picture of the room, including the motion detector, using the camera in the computing device that is running the app.

At 320, the imaging parameters associated with the captured image may be recorded or saved. These parameters may include, for example and without limitation, a magnification level and/or parameters associated with the camera lens that may affect the calculations described below. At 330, the distance between the computing device and the sensor is calculated using the captured image. In an embodiment, this distance may be calculated using the image, the imaging parameters, and known physical dimensions of the sensor as seen in the image. These dimensions may include the width and height of the installed sensor (shown as x and y, respectively, in FIG. 1).

For example, if the imaging technology relies on adjustment of a focal length, then this value would be one of the imaging parameters. This parameter can be more generally understood as a level of magnification or, in layman's terms, "zoom". For a given focal length, the width x of the sensor will appear as a width $x_i$ within the actual overall image. The ratio of x to $x_i$ is therefore calculable. Alternatively, y and $y_i$ may be used to return the same ratio. If this ratio is calculated and the level of magnification is known, the distance to the sensor 110 can be uniquely determined as a matter of descriptive geometry, as understood by a person of ordinary skill in the art. This distance may be either calculated in real time, or may be calculated in advance and stored in a look-up table for use when needed by the user.

At 340, the necessary sensitivity of the sensor may be set, based on the calculated distance. The sensitivity requirement may be determined, in various embodiments, in the computing device or in an external controller or server. The sensitivity requirement may then be communicated to control logic in the sensor to configure the sensor. Alternatively, the determined distance may be communicated to control logic in the sensor and the control logic may set the corresponding sensitivity level.

Figure 4:
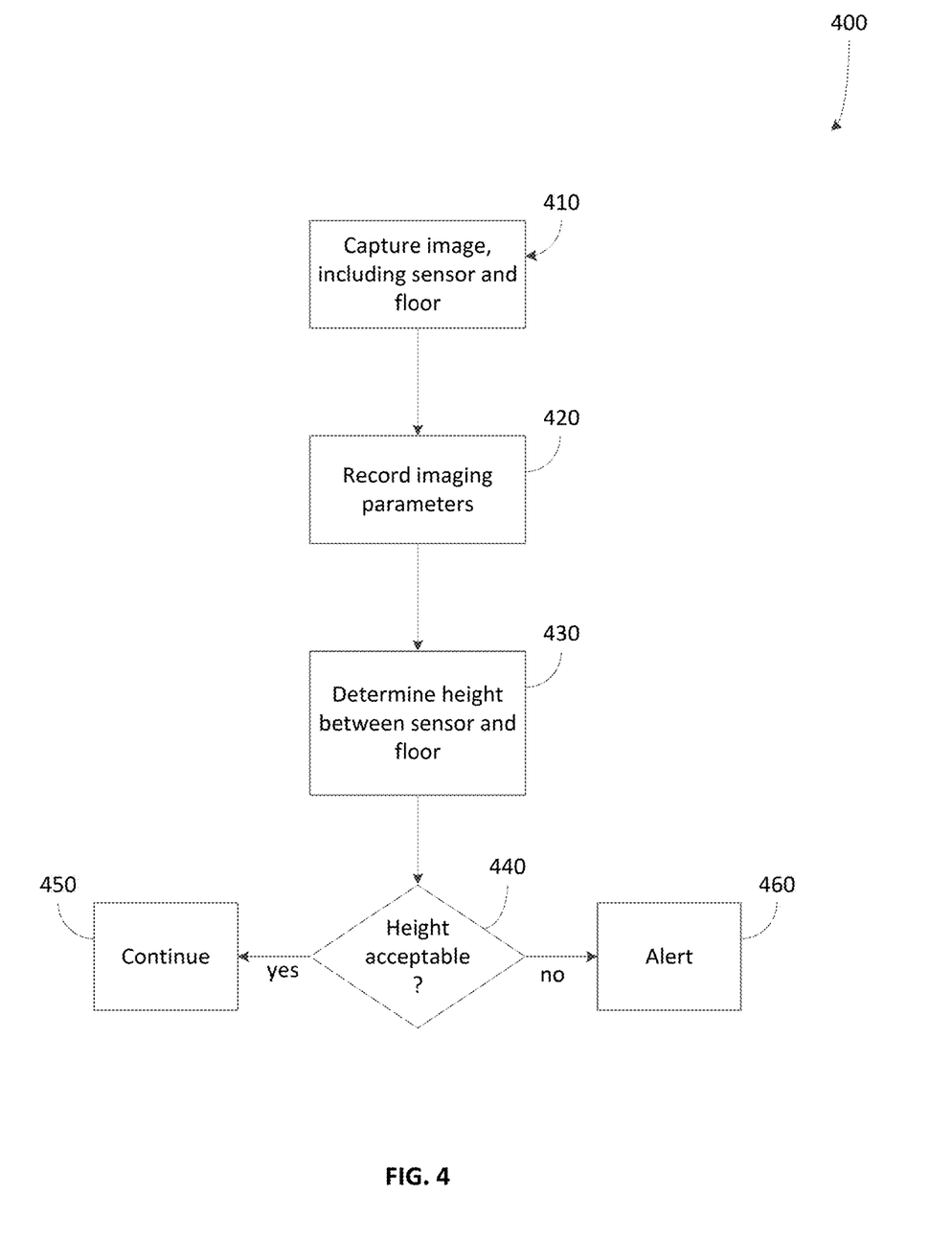
FIG. 4 shows a process that implements a further embodiment of the disclosed subject matter.

FIG. 4 illustrates the processing that may take place when determining whether the height of an installed sensor is suitable for its operation. At 410, an image of a room may be captured, including a sensor such as a motion detector. As discussed above, the image may be captured by a camera incorporated in a portable computing device such as a smartphone or tablet. In an embodiment, the camera may be activated and used as part of an app that supports the installation and/or operation of the sensor. At 420, the imaging parameters associated with the captured image may be saved. These parameters may include, for example and without limitation, a magnification level and/or parameters associated with the camera lens that may affect the calculations described below.

At 430, the height from the floor to the sensor is calculated using the captured image. In an embodiment, this height may be calculated using the imaging parameters and known physical dimensions of the sensor seen in the image. As discussed above, these dimensions may include the width and height of the installed sensor (shown as x and y, respectively, in FIG. 1). For example, by knowing x and the value $x_i$, the ratio of these values may be calculated. A value of the height within the image ($h_i$) may be determined. The ratio and the value $h_i$ may then be used to extrapolate the actual value of h.

At 440, a determination may be made as to whether the height is within an acceptable range. If so, then processing may continue at 450. If not, an alert may be generated at 460. If the illustrated processing is performed in the portable computing device, the alert may be presented via the user interface of the device. If the determination of the acceptability of the height is performed in a controller or server external to the portable computing device, then the controller or server may generate and send a signal representing the alert to the computing device. In an embodiment, the alert may suggest that the sensor be relocated.

Figure 5:
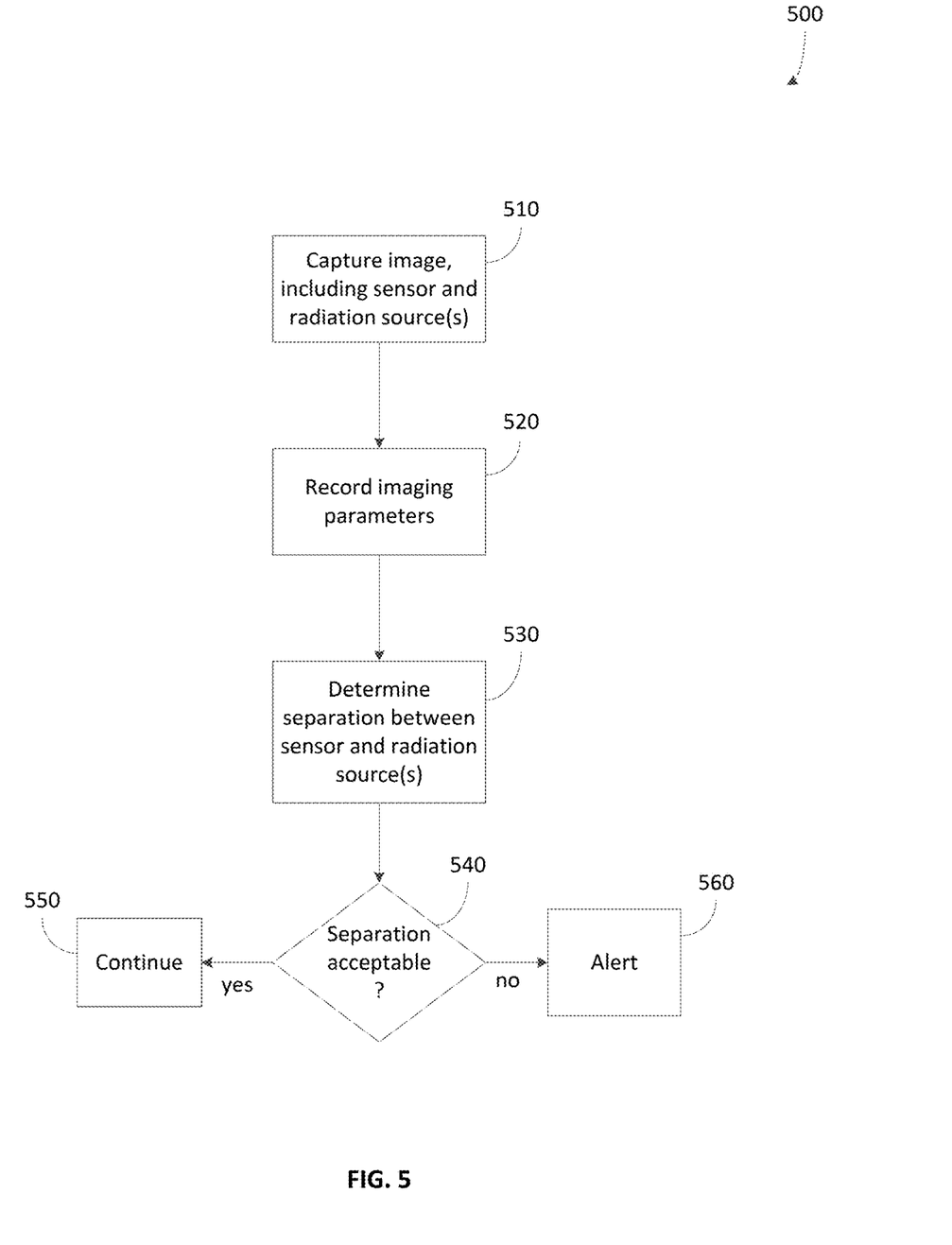
FIG. 5 shows a process that implements another embodiment of the disclosed subject matter.

FIG. 5 illustrates the processing that may take place when determining whether the separation between a sensor and a stationary IR source is suitable. At 510, an image of a room may be captured, including the sensor (such as a motion detector) and the IR source (e.g., a window, door, HVAC vent, radiator, or appliance, such as a lamp or oven). As discussed above, the image may be captured by a camera incorporated in a portable computing device such as a smartphone or tablet and activated and used as part of an app that supports the installation and/or operation of the sensor. At 520, the imaging parameters associated with the captured image may be saved. These parameters may include, for example and without limitation, a magnification level and/or parameters associated with the camera lens that may affect the calculations described below.

At 530, the separation between the IR source and the sensor is calculated using the captured image. In an embodiment, the separation may be calculated using the imaging parameters plus known physical dimensions of the sensor seen in the image. As discussed above, these dimensions may include the known width and height of the installed sensor, and the imaging parameters may include the magnification level used by the camera to image the room. In an embodiment, the value for this separation distance (distance s in FIG. 1) may be determined in a manner analogous to that of the height h as discussed above. This can be a workable solution if the distance from the camera to the sensor is approximately equal to the distance from the camera to the IR source. If these distances are not approximately equal (or to determine if they are), it would be useful to separately calculate the distance from the camera to the IR source. This information, along with the size of the angle between the IR source and the sensor (with the camera as the vertex of the angle), can then be used to calculate the distance between the IR source and the sensor.

At 540, a determination may be made as to whether the separation is an acceptable distance, e.g., greater than a predefined threshold. If so, then processing may continue at 550. If not, an alert may be generated at 560. If the illustrated processing is performed in the computing device, the alert may be presented via the user interface of the device. If the determination of the acceptability of the separation is performed in a controller or server external to the computing device, then the controller or server may generate and send a signal representing the alert to the computing device. In an embodiment, the alert may suggest that the sensor be relocated.

It should be noted that a room may have more than one stationary IR source. The room may have several heating vents and multiple windows, for example. In this situation, there may be a separation determined at 530 for each IR source, i.e., the separation between the sensor and the heating vent, the separation between the sensor and the first window, etc. Each separation may then be evaluated for acceptability at 540, and one or more alerts issued accordingly.

Embodiments disclosed herein refer to one or more sensors. In general, a "sensor" may refer to any device that can obtain information about its environment. Sensors may be described by the type of information they collect. For example, sensor types as disclosed herein may include those that detect motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include single or multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 6:
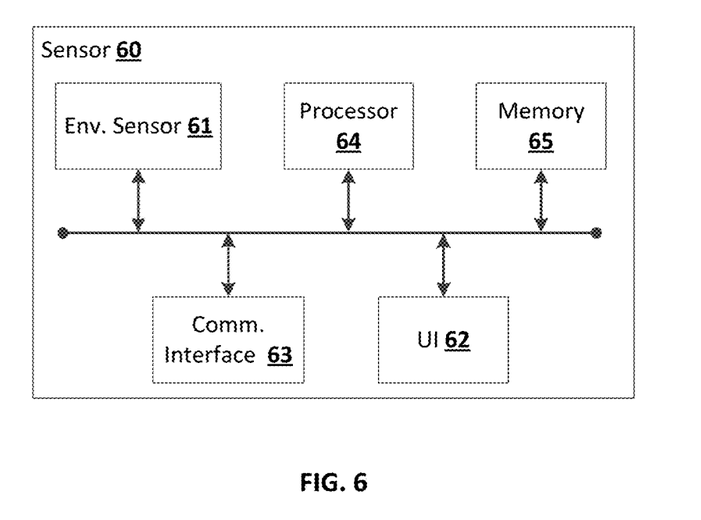
FIG. 6 illustrates the structure of a sensor, according to an embodiment.

A sensor may include hardware in addition to the specific physical sensor that obtains information about the environment. FIG. 6 shows an example sensor as disclosed herein. The sensor 60 may include an environmental sensor 61, such as a temperature sensor, smoke sensor, carbon monoxide sensor, motion detector, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a wi-fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of detected light increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room.

In an embodiment, data generated by a motion detector and the associated time(s) of day may also be stored in a local or remote storage medium with the permission of the end user. The processor in communication with the storage medium may compute a behavior based on the data generated by the motion sensor. The processor may, for example determine a pattern of occupancy in a room. Such a pattern may include the times of the day or week at which a person tends to be present, and/or when a person tends to enter or leave a room.

The system, therefore, may learn occupants' patterns of entering, leaving, or occupying a room, and may generate a response to the learned behavior. For example, if someone tends to occupy a kitchen at 5:30 PM on most days, a smart home environment or other sensor network may automatically activate the lights in the room at that time. In some embodiments, such behavior patterns may be verified using other sensors based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller or server, or to any other device capable of communicating on a network with the one or more sensors. A central controller may be general- or special-purpose. For example, one type of central controller may be used in a home automation network, where the controller collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7:
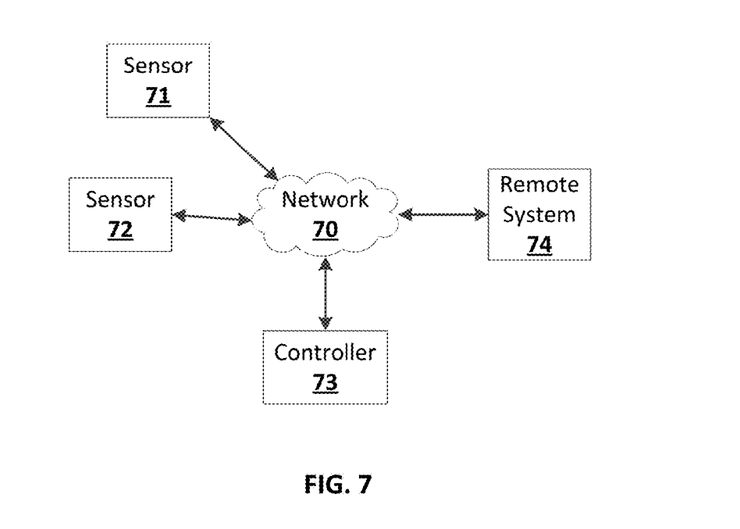
FIG. 7 illustrates a topology for a network of sensors, according to an embodiment.

FIG. 7 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a server or controller 73. The controller may be a general- or special-purpose computer. The controller may, for example, receive, aggregate, and/or analyze environmental information received from the sensors 71 and 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 7 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include a plurality of devices, including intelligent, multi-sensing, and/or network-connected devices, which can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 7.

For example, a smart thermostat may detect ambient climate characteristics (e.g., temperature and/or humidity) and may control an HVAC system. For example, the ambient client characteristics may be detected by sensors 71, 72 shown in FIG. 7, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 7 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 7. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 7. The illustrated smart entry detectors (e.g., sensors 71, 72) may be disposed at one or more windows, doors, and other entry points of the smart-home environment for detecting when a window, door, or other entry point is opened, broken, breached, and/or otherwise compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 7 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 7 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at night time, the controller 73 and/or remote system 74 can activate the outdoor lighting system and/or other lights in the smart-home environment.

Figure 8:
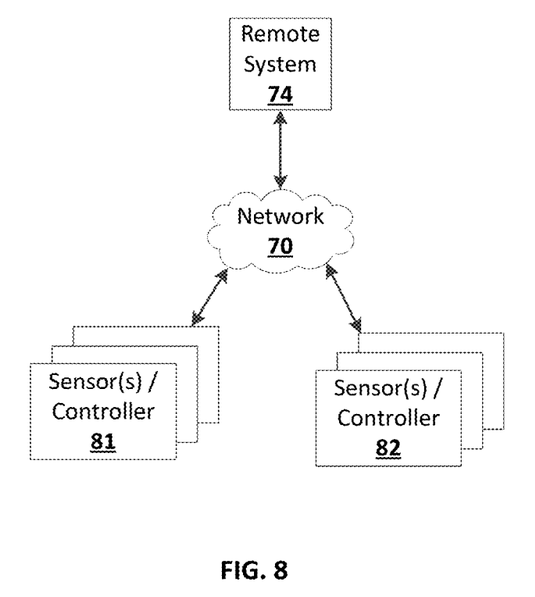
FIG. 8 illustrates the remote communication between sensors and controllers according to an embodiment.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as shown in FIG. 8 may provide information to the remote system 74. The systems 81, 82 may provide data directly from one or more sensors, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 9:
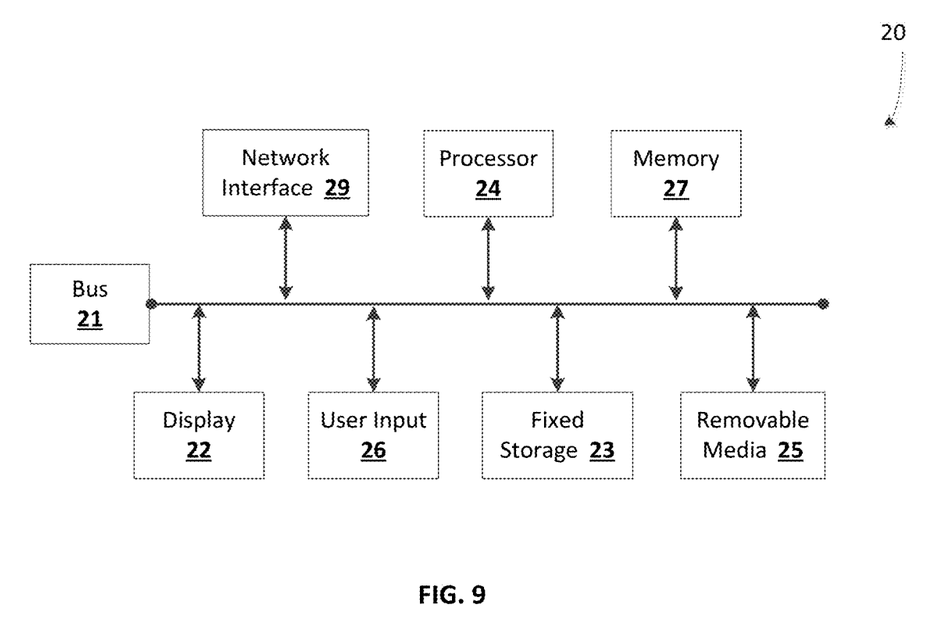
FIG. 9 illustrates a computing device, according to an embodiment.

Embodiments of the presently disclosed subject matter may be implemented in and used with a variety of computing devices. FIG. 9 is an example computing device 20 suitable for implementing embodiments of the presently disclosed subject matter. For example, the device 20 may be used to implement a portable computing device, a controller or server, a device including sensors as disclosed herein, or the like. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, and/or other communication networks, as described in further detail herein.

Figure 10:
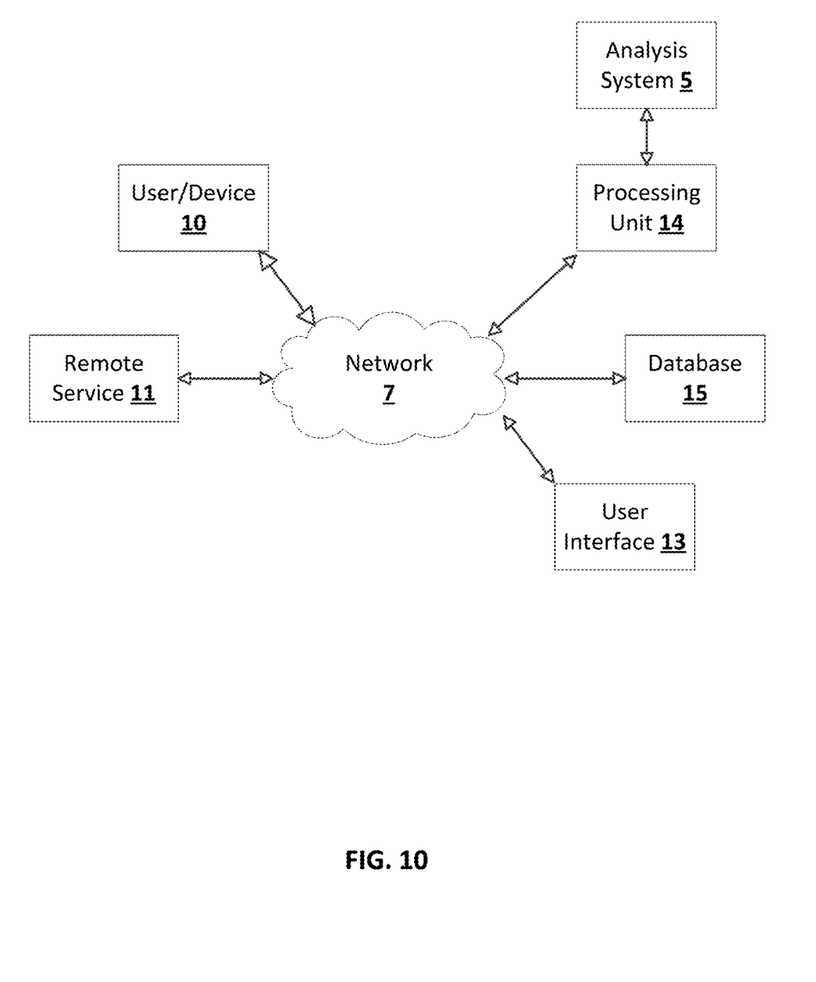
FIG. 10 illustrates a topology that networks a local device with remote resources, according to an embodiment.

FIG. 10 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
receiving an image of at least a portion of a room, the image of the room comprising an image of a sensor mounted in the room;
receiving at least one optical parameter related to the image of the room;
determining a distance between the sensor and a camera that captured the image of the room, wherein the determination of the distance is based at least in part on the image of the room, on the optical parameters, and on known physical dimensions of the sensor;
determining a sensitivity requirement of the sensor, based on the distance;
sending the determined sensitivity requirement to control logic of the sensor; and
configuring the sensor to operate at the determined sensitivity requirement to determine an alarm event.

2. The method of claim 1, wherein the sensor comprises a motion detector.

3. The method of claim 1, further comprising:
using the image, determining a height of the sensor above a floor of the room, wherein the determination of the height is based at least in part on the optical parameters and on the known physical dimensions of the sensor.

4. The method of claim 3, further comprising:
determining if the height of the sensor is within an appropriate range of heights; and
if not, outputting an alert signal.

5. The method of claim 4, wherein the alert signal results in a communication through a user interface, the communication suggesting relocation of the sensor.

6. The method of claim 1, further comprising:
using the image, determining a separation between the sensor and a source of infrared radiation (IR) in the room, wherein the determination of the separation is based at least in part on the optical parameters and on the known physical dimensions of the sensor.

7. The method of claim 6, further comprising:
determining if the separation is greater than a predefined threshold; and
if not, outputting an alert signal.

8. The method of claim 7, wherein the alert signal results in a communication through a user interface, the communication suggesting relocation of the sensor.

9. The method of claim 6, wherein the source of IR comprises one of:
a window;
a door;
a heating, ventilation, or air conditioning (HVAC) vent; or
an appliance.

10. A system comprising:
a processor; and
a memory in communication with the processor, wherein the memory stores instructions that, when executed by the processor, cause the processor to:
receive an image of at least a portion of a room, the image of the room comprising an image of a sensor mounted in the room;
receive at least one optical parameter related to the image of the room;
determine a distance between the sensor and a camera that captured the image of the room, wherein the determination of the distance is based at least in part on the image of the room, on the optical parameters, and on known physical dimensions of the sensor;
determine a sensitivity requirement of the sensor, based on the distance;
send the determined sensitivity requirement to control logic of the sensor;
configure the sensor to operate at the determined sensitivity requirement to determine an alarm event.

11. The system of claim 10, wherein the sensor comprises a motion detector.

12. The system of claim 10, wherein the instructions further cause the processor to:
using the image, determine a height of the sensor above a floor of the room, wherein the determination of the height is based at least in part on the optical parameters and on the known physical dimensions of the sensor.

13. The system of claim 12, wherein the instructions further cause the processor to:
determine if the height of the sensor is within an appropriate range of heights; and
if not, outputting an alert signal.

14. The system of claim 13, wherein the alert signal results in a communication through a user interface, the communication suggesting relocation of the sensor.

15. The system of claim 10, wherein the instructions further cause the processor to:
using the image, determine a separation between the sensor and a source of infrared radiation (IR) in the room, wherein the determination of the separation is based at least in part on the optical parameters and on the known physical dimensions of the sensor.

16. The system of claim 15, wherein the instructions further cause the processor to:
determine if the separation is greater than a predefined threshold; and
if not, outputting an alert signal.

17. The system of claim 16, wherein the alert signal results in a communication through a user interface, the communication suggesting relocation of the sensor.

18. The system of claim 15, wherein the source of IR comprises one of:
a window;
a door;
a heating, ventilation, or air conditioning (HVAC) vent; or
an appliance.

19. The method of claim 1, wherein the at least one optical parameter includes a zoom parameter.

20. The method of claim 1, wherein the alarm event is based on the sensor detecting a security event or an environmental event.

* * * * *